United States Patent
Crank et al.

(10) Patent No.: US 10,713,657 B2
(45) Date of Patent: Jul. 14, 2020

(54) SYSTEMS AND METHODS FOR ESTIMATING AUTHENTICITY OF LOCAL NETWORK OF DEVICE INITIATING REMOTE TRANSACTION

(71) Applicant: CAPITAL ONE SERVICES, LLC, McLean, VA (US)

(72) Inventors: Charles Nathan Crank, Henrico, VA (US); Lawrence F. Altaffer, Richmond, VA (US); Erik Jay S. De Leon, Richmond, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/666,025

(22) Filed: Aug. 1, 2017

(65) Prior Publication Data

US 2019/0043054 A1 Feb. 7, 2019

(51) Int. Cl.
| | |
|---|---|
| *G06Q 20/40* | (2012.01) |
| *G06Q 20/32* | (2012.01) |
| *G06Q 20/16* | (2012.01) |
| *G06F 21/31* | (2013.01) |
| *H04L 29/06* | (2006.01) |

(Continued)

(52) U.S. Cl.
CPC ....... *G06Q 20/4016* (2013.01); *G06F 21/316* (2013.01); *G06Q 20/16* (2013.01); *G06Q 20/3224* (2013.01); *G06Q 20/405* (2013.01); *H04L 63/0876* (2013.01);

(Continued)

(58) Field of Classification Search
CPC ...... G06Q 20/04; G06Q 20/10; G06Q 20/403; G06Q 40/12; G06Q 40/02; G06Q 30/08; G06Q 20/3821; G06Q 30/0277; G06Q 30/100635; G06Q 20/409; G06Q 20/3674; G06Q 20/102; G06Q 20/382; G06Q 20/4016; G06Q 20/12; G06Q 30/0185;

(Continued)

(56) References Cited

U.S. PATENT DOCUMENTS

| | | | |
|---|---|---|---|
| 8,572,391 B2 * | 10/2013 | Golan | G06F 21/40 705/72 |
| 2003/0126437 A1 * | 7/2003 | Wheeler | G06F 21/32 713/168 |

(Continued)

FOREIGN PATENT DOCUMENTS

WO 2017011345 A1 1/2017

OTHER PUBLICATIONS

Extended European Search Report in related EP Application No. 18186761.5, dated Nov. 15, 2018.

*Primary Examiner* — Johann Y Choo
(74) *Attorney, Agent, or Firm* — Troutman Sanders LLP; Christopher J. Forstner; John A. Morrissett (57) ABSTRACT

A system includes one or more memory devices storing instructions, and one or more processors configured to execute the instructions to perform steps of a method for providing network security. The system may receive customer credentials in association with an attempted transaction initiated by a user device that is connected to a local network. The system may receive network identification data associated with the local network and generate a network confidence score based on the network identification data and a historical local network footprint. The system may determine a security action based on the network confidence score.

26 Claims, 3 Drawing Sheets

(51) Int. Cl.
*H04W 12/06* (2009.01)
*H04W 12/08* (2009.01)

(52) U.S. Cl.
CPC .......... *H04L 63/107* (2013.01); *H04W 12/06* (2013.01); *H04W 12/08* (2013.01)

(58) Field of Classification Search
CPC ............. G06Q 10/06375; G06Q 50/01; G06Q 30/0611
See application file for complete search history.

(56) References Cited

U.S. PATENT DOCUMENTS

| | | | | |
|---|---|---|---|---|
| 2003/0195843 | A1* | 10/2003 | Matsuda | G06Q 20/04 705/39 |
| 2005/0097320 | A1* | 5/2005 | Golan | G06F 21/40 713/166 |
| 2008/0208760 | A1* | 8/2008 | Keithley | G06Q 20/04 705/75 |
| 2012/0144461 | A1* | 6/2012 | Rathbun | H04L 9/3213 726/5 |
| 2013/0160078 | A1* | 6/2013 | Yang | H04L 9/32 726/2 |
| 2015/0095990 | A1 | 4/2015 | Ranganathan et al. | |
| 2016/0191540 | A1* | 6/2016 | Fuka | G06F 16/86 726/4 |
| 2016/0196558 | A1* | 7/2016 | Mercille | G06Q 20/327 705/44 |
| 2016/0373442 | A1 | 12/2016 | Bruch et al. | |

* cited by examiner

SYSTEMS AND METHODS FOR ESTIMATING AUTHENTICITY OF LOCAL NETWORK OF DEVICE INITIATING REMOTE TRANSACTION

FIELD OF INVENTION

The present disclosure relates to systems and methods for estimating authenticity of a remote user via a network confidence estimate, and more particularly providing systems and methods for determining a confidence estimate regarding whether a remote device that has initiated a transaction is actually initiating the transaction from the local network that it appears to be initiating the transaction from.

BACKGROUND

Electronic transactions such as money transfers, bill payments, and purchases are commonly initiated using a remote device via the Internet. Although financial service providers typically require login credentials to authenticate the identity of a user attempting to initiate such a transaction, those login credentials can be compromised by hacking, identify theft, and other such means. In response, financial service providers may attempt to provide additional means of authenticating a user, such as attempting to verify that the user is initiating the transaction using a known and/or commonly used device or network.

For example, a financial service provider may detect and track the external Internet Protocol (IP) address, Basic Service Set Identifier (BSSID), or Service Set Identifier (SSID) of a device or network over the course of multiple transactions to determine whether there is consistency in the device and/or network that is being used to initiate the transactions in association with the particular customer login credentials. If the system detects that the user is attempting to login from a device or network that is unknown or not commonly used, then the system may determine that there is an increased potential that the attempt to initiate the transaction may be fraudulent. However, this additional method of attempting to assess the legitimacy of the device/network/transaction may be insufficient, because external IP addresses, BSSIDs, and SSIDs may easy to spoof or may be fooled by the presence of a virtual private network (VPN) or other such means of obfuscating or misrepresenting the identity of the network used by the remote device, allowing scammers to impersonate the device and/or network to circumvent this additional security check.

Accordingly, there is a need for improved systems and methods for providing network security by estimating the authenticity of a local network used by a device to initiate a remote transaction or login to an account. Embodiments of the present disclosure are directed to this and other considerations.

SUMMARY

Disclosed embodiments provide systems and methods for providing network security.

Consistent with the disclosed embodiments, the system may include one or more memory devices storing instructions, and one or more processors configured to execute the instructions to perform steps of a method of providing network security. The system may execute the instructions to receive customer credentials in association with an attempted transaction initiated by a user device that is connected to a local network. The system may receive network identification data associated with the local network and generate a network confidence score based on the network identification data and a historical local network footprint. The system may determine a security action based on the network confidence score Consistent with the disclosed embodiments, methods for providing network security are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for providing enhanced network security. The system may include one or more memory devices storing instructions, and one or more processors configured to execute the instructions to perform steps of a method. Specifically, in some embodiments, the system may execute the instructions to receive customer credentials in association with an attempted transaction initiated by a user device that is connected to a local network. The system may receive network identification data associated with the local network and generate a network confidence score based on the network identification data and a historical local network footprint. The system may determine a security action based on the network confidence score.

In another embodiment, a method for providing network security is provided. The method may include receiving customer credentials in association with an attempted transaction initiated by a user device that is connected to a local network. The method may include receiving network identification data associated with the local network and generating a network confidence score based on the network identification data and a historical local network footprint. The method may further include determining a security action based on the network confidence score.

In another embodiment a non-transitory computer-readable medium is disclosed. The non-transitory computer-readable medium may store instructions that, when executed by one or more processors, cause a system to receive customer credentials in association with an attempted transaction initiated by a user device that is connected to a local network. The system may receive network identification data associated with the local network and generate a network confidence score based on the network identification data and a historical local network footprint. The system may determine a security action based on the network confidence score Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
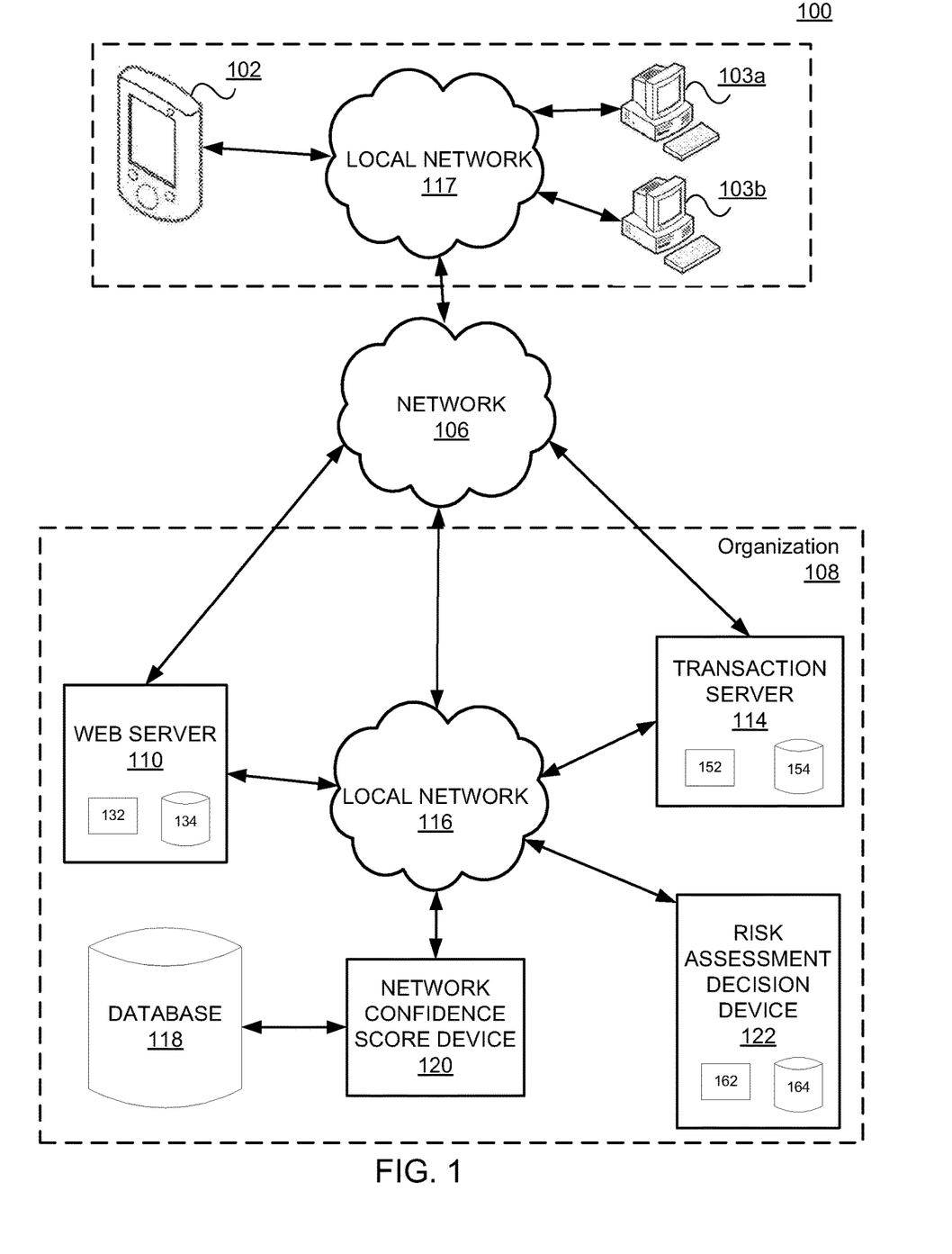
FIG. 1 is a diagram of an exemplary system that may be used to provide network security.

FIG. 1 is a diagram of an exemplary system 100 that may be configured to perform one or more processes that may provide network security by estimating the authenticity of a local network of a device that is attempting to initiate a remote transaction or login. The components and arrangements shown in FIG. 1 are not intended to limit the disclosed embodiments as the components used to implement the disclosed processes and features may vary. As shown, system 100 may include a first user device 102, a second user device 103, a network 106, and an organization 108 including, for example, a web server 110, a transaction server 114, a first local network 116, a second local network 117, a database 118, a network confidence score (NCS) device 120, and a risk assessment decision (RAD) device 122.

In some embodiments, a customer may operate a first user device 102 and/or one or more a secondary user devices 103 (which may also simply be referred to as user devices). User devices 102, 103 can include one or more of a mobile device, smart phone, general purpose computer, tablet computer, laptop computer, telephone, PSTN landline, smart wearable device, voice command device, other mobile computing device, or any other device capable of communicating with a first local network 117, network 106, and ultimately communicating with one or more components of organization 108. In some embodiments, a user device may include or incorporate electronic communication devices for hearing or vision impaired users. User devices 102, 103 may belong to or be provided by a customer, or may be borrowed, rented, or shared. Customers may include individuals such as, for example, subscribers, clients, prospective clients, or customers of an entity associated with organization 108, such as individuals who have obtained, will obtain, or may obtain a product, service, or consultation from an entity associated with organization 108. According to some embodiments, user devices 102, 103 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors. In some embodiments, user devices 102, 103 may include applications or software that may determine network identification data associated with the hosting device and/or one or more connected devices that may be transmitted to system 100 (e.g., to web server 110).

For example, according to some embodiments, a user device 102 initiating a remote transaction with organization 108 may include a software application that enables user device 102 to obtain network identification data associated with user device 102, local network 117 (and associated devices such as routers, modems, etc.), and other user devices 103 that are connected to local network 117 or otherwise networked with user device 102. As will be appreciated by those of skill in the art, a software application such as, for example but not limited to, nmap, NetCat, Packet Sender, or the like, may utilize port scanning and host discovery capabilities to obtain network identification data from one or more networked devices. According to some embodiments, user device 102 may obtain network information data by retrieving data from other devices on the local network 117 by either connecting to the other devices or reading the data they broadcast. In some embodiments, user device may obtain network information by retrieving data from internal storage of user device 102. For example, WAN and LAN IP addresses may be stored by user device 102 and may thus be retrieved from the internal storage of user device 102, whereas IP addresses of other devices 103 on the local network 117 may have to be ascertained by user device 102 connecting to the other devices 103.

In some embodiments, the network identification data collected by user device 102 may be transmitted from user device 102 to web server 110. For example, in some embodiments, user device 102 may be a mobile phone that includes a mobile application that may activate certain features or functions of mobile device 102 to collect network identification data from user device 102 and other devices 103 connected to local network 117. According to some embodiments, after obtaining network identification data, the mobile phone may transmit the network identification to web server 110.

According to some embodiments, user device 102 may include software tools that may enable user device 102 to collect device data, location data, and extended network data from and/or associated with user device 102, local network 117, and/or one or more other devices 103 connected to local network 117.

According to some embodiments, device data may include for example, without limitation, operating system (OS) version, mobile application version, MAC addresses associated with user devices 102, 103 (e.g., MAC addresses associated with cellular and WiFi connectors), storage size, information relating to device caches (e.g., L1, L2, L3 caches) such as the sizes of hardware caches storage in bytes, device management profiles (i.e., applications installed on a device to manage what the end user can do with the device, as well as handling pre-installing applications, pre-configuring network and/or VPN settings, limiting the use of certain applications, etc.), screen size, installed applications, RAM information such as the size of RAM in bytes and/or the type of RAM, processor information such as the manufacturer, model, speed, and other such characteristics of the processor, camera statistics, and Windows DOMAIN (i.e., a string of characters that represents the domain name used to bind the device to active directory servers that manage accounts centrally instead of locally on each device).

In some embodiments, location data collected may include, without limitation, WAN IP, connected SSID(s), disconnected stored SSID(s), location services/GPS information, Bluetooth™ connections to other devices, disconnected paired Bluetooth™ devices, and trace routes (i.e., a log of all of the servers between a sending device and a receiving device associated with a target IP address, which may include IP addresses, DNS names, response times, and other such data associated with the intermediate servers).

In some embodiments, extended network data may include for example, without limitation, LAN IP(s) (including v4/v6), MAC addresses (e.g., MAC addresses of a LAN, WAN, and or other connected devices), open/closed/filtered ports, OS fingerprinting, bonjour services, UPnP, host name (s), services, vendor, and DNS servers. As those of skill in the art will recognize, Bonjour and UPnP are zero-configuration networking standards designed to make it easy for users to find devices (such as other computers or printers) on a local network without knowing the technical information required to connect to them. Host names may be human readable alternatives to IP addresses that may be used to more easily and dynamically point to a device. According to some embodiments, a DNS server connected to the network may be capable of resolving a host-name into an IP address to allow devices to connect to one another. In some embodiments, services may be gathered via open/closed/filtered port statuses on a device. For example, when a port is open or filtered it may be inferred that a service is running on that port, and other details of the packets sent to and from the port may reveal what version of a service is being run on the port. Further, in some embodiments, various ports of a device may be reserved for certain services. For example, port 22 is commonly used for Secure Shell (SSH). According to some embodiments, vendor may be determined from a MAC address and/or open ports. DNS servers are a list of IP addresses or domain names that a network may use by default to resolve domain and host names into IP addresses.

According to some embodiments, the device data, location data, and/or extended network data collected by user device 102, 103 may be collected in association with one or more user devices 102, 103, routers, modems, or other devices connected to, or used to operate local network 117 such as mobile phones, tablets, computers, game consoles, ebook readers, or any IoT device such as lights, cameras, vacuums, AC units, speakers, or any other such device having the capability of connecting to network 117.

Network 106 may be of any suitable type, including individual connections via the internet such as cellular or WiFi networks. In some embodiments, network 106 may connect terminals, services, and mobile devices including by using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Organization 108 may be associated with an entity such as a business, corporation, individual, partnership, or any other group that provides one or more of goods, services, and consultations to individuals who are or potentially are consumers of those goods, services, and consultations.

Organization 108 may include one or more servers, devices, and computer systems for performing one or more functions associated with products and/or services that organization 108 provides. Such servers, devices, and computer systems may include, for example, web server 110, transaction server 114, NCS device 120, and RAD device 122, as well as any other computer systems necessary to accomplish tasks associated with organization 108 or the needs of customers (which may be customers of the entity associated with organization 108).

Web server 110 may include a computer system configured to generate and provide one or more websites accessible to customers, as well as any other individuals involved in organization 108's normal operations. Web server 110 may include a computer system configured to receive communications from a user device 102 via for example, a mobile application, a chat program, an instant messaging program, a voice-to-text program, an SMS message, email, or any other type or format of written or electronic communication. Web server 110 may have one or more processors 132 and one or more web server databases 134, which may be any suitable repository of website data. Information stored in web server 110 may be accessed (e.g., retrieved, updated, and added to) via local network 116 and/or network 106 by one or more devices (e.g., NCS device 120) of system 100. In some embodiments, web server 110 may host websites or applications that may be accessed by one or more user devices 102, 103. For example, web server 110 may host a financial service provider website that a user device may access by providing customer credentials that are authenticated by web server 110. Web server 110 may provide functionality to allow an authenticated user to execute transactions, such as initiating money transfers, bill payments, and other such financial service transactions. In some embodiments, web server 110 may be configured to deny an attempted transaction (e.g., deny a login attempt) or issue a security challenge to user device 102 in response to a determination that a network confidence score does not exceed a predetermined threshold. According to some embodiments, web server 110 may include software tools, similar to those described with respect to user device 102 above, that may allow web server 110 to obtain network identification data from user device 102, or one or more other devices 103 connected to local network 117

Transaction server 114 may include a computer system configured to process one or more transactions involving an account associated with a customer, or a request received from customers. In some embodiments, transactions can include, for example, a product/service purchase, product/service return, financial transfer, financial deposit, financial withdrawal, financial credit, financial debit, dispute request, warranty coverage request, and any other type of transaction associated with the products and/or services that an entity associated with organization 108 provides to individuals such as customers. Transaction server 114 may have one or more processors 152 and one or more transaction server databases 154, which may be any suitable repository of transaction data. Information stored in transaction server 114 may be accessed (e.g., retrieved, updated, and added to) via local network 116 and/or network 106 by one or more devices (e.g., NCS device 120) of system 100. According to some embodiments, transaction server 114 may store transaction data that may be used by the system 100 to assist in generating a network confidence score.

In some embodiments, transaction server 114 tracks and stores event data regarding interactions between a third party, such as third party server, with organization 108, on behalf of the individual. For example, transaction server 114 may track third party interactions such as purchase requests, refund requests, warranty claims, account withdrawals and deposits, and any other type of interaction that the third party server may conduct with organization 108 on behalf of an individual such as customer.

Local networks 116, 117 may comprise any type of computer networking arrangement used to exchange data in a localized area, such as WiFi, Bluetooth™ Ethernet, and other suitable network connections that enable components of organization 108 or user devices 102, 103 to interact with one another and to connect to network 106 for interacting with components in system environment 100. In some embodiments, local networks 116, 117 may comprise an interface for communicating with or linking to network 106. In other embodiments, components of organization 208 may communicate via network 106, without a separate local network 116. In some embodiments, local network 117 may comprise a home network, such as a LAN or WLAN set up in a user's house. In some embodiments, local network 117 may be commonly used network of a local business, such as, for example, a Wi-Fi network at a particular coffee shop.

According to some embodiments, database 118 may be a database associated with organization 108 and/or its related entity that may store a variety of information relating to customers, transactions, customer credentials, customer networks and devices, and business operations. Database 118 may also serve as a back-up storage device and may contain data and information that is also stored on, for example, local databases associated with web server 110, transaction server 114, NCS device 120, and RAD device 122. Database 118 may be accessed by other devices (e.g., NCS device 120) and may be used to store records of every interaction, communication, and/or transaction a particular customer has had with organization 108 and/or its related entity, including historical network identification data associated with the previous customer interactions.

NCS device 120 may include a computer system configured to generate a network confidence score based on network identification data. In some embodiments, a network confidence score may represent an estimate of confidence that a local network 117 used by a user device 102 to initiate a transaction in association with a particular set of customer credentials is the actual network that it appears to be in relation to some network-identifying information (such as, a purported external IP address of local network 117) transmitted to organization 108 in association with the attempted transaction initiated by user device 102 in association with the particular set of customer credentials. In some embodiments, a network confidence score may be a number. For example, a network confidence score may be a number between 0 and 99, a percentage, a ratio, a 32 bit floating point number between 0 and 1, or any other suitable scale. As will be appreciated, in various embodiments, a network confidence score may have different formats, scales (e.g., linear, exponential, etc.), or data types, and the preceding examples are in no way limiting. According to some embodiments, the network identification data may be representative of information associated with, for example, local network 117 and/or one or more user devices (e.g., user devices 102, 103) connected to or associated with local network 117. According to some embodiments, NCS device 120 may generate a network confidence score based on recently collected network identification data in addition to previously collected network identification data that may include known devices, known networks, and known locations. In some embodiments, NCS device 120 may use a footprint model to track network attributes over time to determine the confidence score. For example, NCS device 120 may generate an initial footprint the first time a specific local network 117 is used by a user device 102 to login to an account (e.g., via web server 110) in association with a particular set of customer credentials. The initial footprint may include an initial set of device data, location data, and extended network data that represents all of the detectable devices that are connected to the local network 117 and their attributes.

For example, if a user uses a mobile device 102 connected to a local network 117 to login to an account (e.g., to initiate a transaction), system 100 (e.g., via web server 110) may detect that there is also a laptop computer 103a and a tablet device 103b connected to the local network 117. System 100 may collect initial device data, location data, and extended network data on all three user devices 102, 103a, 103b, as well as any other devices that are connected to network 117 such as routers, repeaters, modems, game consoles, TV set top boxes IoT devices such as light bulbs, speakers, cameras, washing machines, and any other type of device that is capable of connecting to network 117, and use this information to create an initial footprint of local network 117. The initial footprint may indicate which devices are connected to the network and what the attributes of those devices are (e.g., OS version, screen size, MAC address, etc.). According to some embodiments, the next time a user device 102 attempts to log into an account or initiate a transaction in association with the particular set of customer credentials, system 100 (e.g., via web server 110) may generate a current footprint by obtaining a new set of device data, location data, and extended network data on all of the devices that are connected to the local network 117. NCS device 120 may then compare the current footprint to the initial footprint to determine points of overlap.

For example, if the initial footprint includes information that indicates a laptop computer 103a and a tablet device 103b are connected to the same local network 117 as the user device 102 attempting to initiate the transaction in association with the particular customer credentials, NCS device 120 may determine that the new current footprint includes information that indicates that the same laptop computer 103a and the same tablet device 103b are still connected to the local network 117. Any device or device attribute that is present in both the initial footprint and the current footprint may be referred to as being an overlapping device or attribute, or collectively, overlapping data points.

According to some embodiments, NCS device 120 may generate a network confidence score based on the number and/or the nature of the overlapping data points. For example, NCS device 120 may include an algorithm that generates a network confidence score by comparing a current footprint to one or more previous footprints to determine overlapping data points. In general, overlapping data points may tend to indicate that the current local network 117 being used by user device 102 to initiate a transaction is the same as a previous local network 117 used by user device 102 to initiate a previous transaction. Thus, if user device 102 attempts to initiate a transaction from local network 117 and the local network that user device 102 appears to be using (e.g., as indicated by the IP address of the local network) is, for example, "User's Home Network," the system 100 may compare the current footprint of the local network 117 to a previous footprint associated with "User's Home Network" and determine a confidence estimate indicating whether local network 117 really is "User's Home Network," as a way of providing further authentication of the user.

According to some embodiments, the network confidence score may represent a combination (e.g., a summation) of a device data score, a location data score, a connected network score, and an attached device score, where each of these scores represents the degree of overlap between a current footprint and a previous footprint. For example, a device data score may represent a comparison of the features, device specifications, software versions, and data of a user device 102 from an initial footprint to a current footprint. A location data score may represent the similarity of location data of user device 102 from an initial footprint to a current footprint. According to some embodiments, location data may be generated based on any location services running on user device 102, which may obtain location information in variety of ways, such as through GPS, cell-tower triangulation, IP address, other such location data points, or a combination thereof. A connected network score may represent, for example, a comparison of information connected from a network (e.g., local network 117) such as information about other devices connected to the network, traceroute information, router information such as BSSID and/or SSID, and other such network information from an initial footprint to a current footprint. According to some embodiments, a connected network score may represent the combination of scores of a plurality of networks, such as for example, a plurality of local networks 117 used by user device 102. An attached device score may represent a comparison of the other devices (e.g., Bluetooth devices) that are connected to or detectable by user device 102 and taking into account the device locations from an initial footprint to the current footprint. For example, a smart watch owned by a user of user device 102 may always be paired or available for pairing (e.g., via Bluetooth) with user device 102, whereas a pair of headphones may only be available for pairing with user device 102 at home or at the office. According to some embodiments, NCS device 120 may generate a network confidence score from data obtained from a mobile application (e.g., on a mobile phone) using a different algorithm than NCS device 120 would use if the network confidence score was generated from data obtained from a website.

Although the present disclosure describes the creation of a network confidence score by processing various input data points using one or more algorithms, it should be understood that the process used to generate a network confidence score may vary among different embodiments, and may further vary over time as the system 100 may use machine learning techniques to refine the algorithms and input data used. Accordingly, the algorithms used by system 100 may be flexible and adaptive. In some embodiments, the algorithm may weight one or more particular data points or scores more heavily than others in generating the network confidence score. The weighting of data points may be manually changed by an operator of system 100 or may be automatically changed by implementing machine learning techniques on system 100. Further, in some embodiments, NCS device 120 may determine that some devices connected to local network 117 are more transient than others and therefore may place a lower weight on the overlap of those devices. For example, there may be a case where a first user uses their mobile phone (e.g., user device 102) to initiate transactions using a home network (e.g., local network 117), but the first user has a roommate that has a second mobile phone (e.g., a second user device 102 or a user device 103a) that is intermittently connected to the home network (i.e., based on whether or not the roommate is home or not). In this case, NCS device 120 may determine that the second mobile phone is a transient device that is only intermittently connected to home network and accordingly, NCS device 120 may not heavily weight the presence or absence of this device in generating the network confidence score. Further, in some embodiments, NCS device 120 may weight a given data point differently based on the time and/or date in relation to the transience of the device. For example, in the previous example involving the roommate's mobile phone, NCS device 120 may determine that the roommate's mobile phone is generally present on the home network at night, but not during the day, and accordingly NCS device 120 may place a greater weight on the presence or absence of the roommate's mobile phone from the home network at night than it does during the day. Different devices may have different levels or patterns of transience, and in some embodiments, NCS device 120 may determine or model the transience of one or more devices connected to local network 117 and generate a weighting for data points associated with those devices based on the determined transience of the device. Accordingly, in some embodiments, NCS device 120 may maintain a footprint model that is updated over time as local network 117 changes and attached devices are introduced and removed. For example, a user may replace a first laptop computer 103a with a different laptop computer 103b, and overtime the footprint model maintained by NCS device 120 may reduce or eliminate the relevance of the presence of the first laptop computer 103a in the current footprint in generating the network confidence score. In some embodiments, NCS device 120 may use artificial intelligence learning techniques to modify the footprint model and/or algorithm used to generate a network confidence score over time.

According to some embodiments, the footprint model maintained by NCS device 120 may include network identification data in association with more than one local network 117. For example, a user may regularly use their home network to initiate transactions, however, they may also commonly use a local network 117 of a local coffee shop. Accordingly, in some embodiments, a footprint model maintained by NCS device 120 may account for multiple local networks 117 that have previously been used to initiate transactions in association with a particular set of customer credentials. According to some embodiments, the first time a user device 102 uses a new local network 117 to login to an account or initiate a transaction in association with a particular set of customer credentials, NCS device 120 may generate a very low network confidence score and system 100 may issue a challenge to the user to that the login/transaction attempt is legitimate before allowing it to proceed. For example, in some embodiments, system 100 may initiate a security action such as requiring second or third factor authentication prior to authorizing a transaction if a user attempts a transaction using an unknown local network 117 or a local network 117 that has never been used by a user associated with the account that is the subject of the attempted transaction. According to some embodiments, if a user device 102 attempts to log into an account or initiate a transaction using a particular local network 117 that system 100 has footprinted before, even if it was previously footprinted in association with a login associated with a different user's login credentials, NCS device 120 may use the familiarity with the local network 117 to generate a higher network confidence score than it would generate for a local network 117 that it had not previously footprinted before. Thus, according to some embodiments, NCS device 120 may develop footprint models of particular local networks 117 from data obtained from a plurality of different users attempting to initiate transactions using the particular local networks 117.

According to some embodiments, NCS device 120 may use a footprint model involving multiple different local networks 117 that takes the physical locations of the various local networks 117 and the timing of the attempted logins/transactions into account. For example, if a first login attempt is made from a home network 117 located in New York City, and a second login attempt is made from a coffee shop local network 117 located in Los Angeles 30 minutes later, the footprint model NCS device 120 may flag this as being suspicious, thereby leading to a low network confidence score. Further, in some embodiments, the footprint model of NCS device 120 may incorporate transaction data from transaction server 114 as in input in generating a network confidence score. For example, if system 100 detects that a user device 102 is attempting to login to an account associated with a particular customer's credentials using a coffee shop's local network 117, NSC device 120 may access transaction data stored on transaction server 114 and see that, for example, a purchase was recently made at that coffee shop using a debit card associated with the user that is associated with the particular customer credentials, thereby indicating that the user associated with the particular customer credentials is likely physically located at the coffee shop, which may cause NCS device 120 to generate a higher network confidence score.

RAD device 122 may include a computer system configured to generate a risk assessment based on the network confidence score generated by NCS device 120. RAD device 122 may be further configured to initiate a security action based on the risk assessment. According to some embodiments, a security action may include denying an attempted transaction or login attempt, issuing a security challenge, or allowing an attempted transaction or login attempt. According to some embodiments, if RAD device 122 denies an attempted transaction or login attempt, RAD device 122 may transmit a message to web server 110 and/or transaction server 114 to cause the denial of the login attempt or transaction. In some embodiments, issuing a security challenge may include, for example, sending a message, such as a text message, email, or phone call, to an account or device associated with the user of the customer credentials used to attempt a login or transaction, and requesting the user to provide verification information to validate the attempted transaction or login attempt. For example, system 100 may challenge the user to provide security information such as a temporary pin number or answering a security question. According to some embodiments, RAD device 122 may generate a risk assessment based on the network confidence score in combination with other risk factors provided to RAD device 122. According to some embodiments, the other risk factors provided to RAD device may include, for example, location information (e.g., as indicated by IP address or system location services), whether the device is known or unknown, information relating to recent online activity associated with an account (e.g., whether the account has been locked recently, recent suspicious online activity, recent suspicious transactions, etc.) and many other such factors that may provide an indication as to whether a party is or has been attempting unauthorized or fraudulent access or activity in association with a particular account.

Although the preceding description describes various functions of user devices 102, 103, web server 110, transaction server 114, database 118, NCS device 120, and RAD device 122, in some embodiments, some or all of these functions may be carried out by a single computing device.

For ease of discussion, embodiments may be described in connection with the estimating the authenticity of a local network in the context of a device that is attempting to initiate a transaction, such as a financial transaction. It is to be understood, however, that disclosed embodiments are not limited to estimating the authenticity of a local network in the context of an attempt to execute a transaction, but may be applied to any circumstance in which a remote device 102, 103 is interacting with an organization 108 and it may be desirable to attempt to verify that the remote device 102, 103 is actually connecting to organization 108 via the local network 117 that it appears to be using. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

Figure 2:
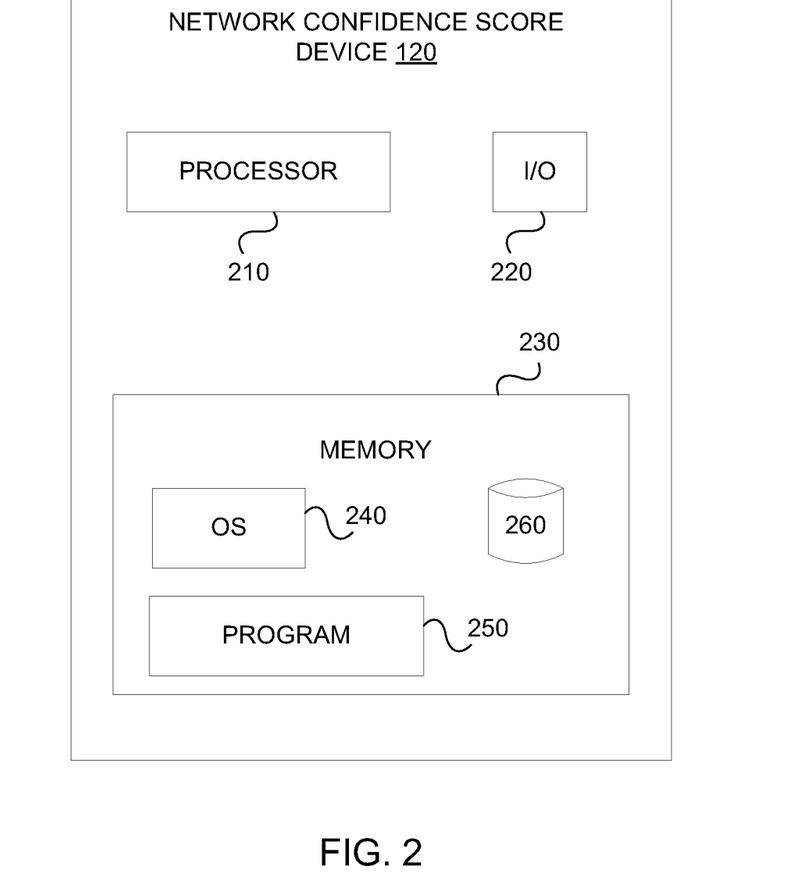
FIG. 2 is a component diagram of an exemplary network confidence score device.

An exemplary embodiment of NCS device 120 is shown in more detail in FIG. 2. Web server 110, call center server 112, transaction server 114, RAD device 122 and/or user devices 102, 103 may have a similar structure and may include many components that are similar to or even have the same capabilities as those described with respect to NCS device 120. As shown, NCS device 120 may include a processor 210, an input/output ("I/O") device 220, a memory 230 containing an operating system ("OS") 240 and a program 250. For example, NCS device 120 may be a single device or server or may be configured as a distributed computer system including multiple servers, devices, or computers that interoperate to perform one or more of the processes and functionalities associated with the disclosed embodiments. In some embodiments, NCS device 120 may further include a peripheral interface, a transceiver, a mobile network interface in communication with the processor 210, a bus configured to facilitate communication between the various components of NCS device 120, and a power source configured to power one or more components of NCS device 120.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to components requiring power.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

NCS device 120 may include one or more storage devices configured to store information used by processor 210 (or other components) to perform certain functions related to the disclosed embodiments. In some embodiments, NCS device 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, NCS device 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, NCS device 120 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments. In some embodiments, NCS device 120 may include a network confidence scoring program 250 that is a rules-based program for generating a network confidence score that may represent an estimate of confidence that the local network that a user device 102 appears to be using (e.g., local network 117) to attempt to initiate a transaction by interacting with organization 108 is actually the local network being used by user device 102. According to some embodiments, the identity of the local network that user device 102 appears to be using may be determined from an IP address associated with user device 102, an IP address associated with a router of the local network being used by user device 102, an external IP address, the BSSID of a network, and/or an SSID of a network.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a database 260 for storing related data to enable NCS device 120 to perform one or more of the processes and functionalities associated with the disclosed embodiments.

NCS device 120 may also be communicatively connected to one or more memory devices (e.g., databases) locally or through a network. The remote memory devices may be configured to store information and may be accessed and/or managed by NCS device 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

NCS device 120 may also include one or more I/O devices 220 that may comprise one or more interfaces for receiving signals or input from devices and providing signals or output to one or more devices that allow data to be received and/or transmitted by NCS device 120. For example, NCS device 120 may include interface components, which may provide interfaces to one or more input devices, such as one or more keyboards, mouse devices, touch screens, track pads, trackballs, scroll wheels, digital cameras, microphones, sensors, and the like, that enable NCS device 120 to receive data from one or more users.

In exemplary embodiments of the disclosed technology, NCS device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While web server 110, call center server 112, transaction server 114, NCS device 120, and RAD device 122 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the web server 110, call center server 112, transaction server 114, NCS device 120, and RAD device 122 may include a greater or lesser number of components than those illustrated.

Figure 3:
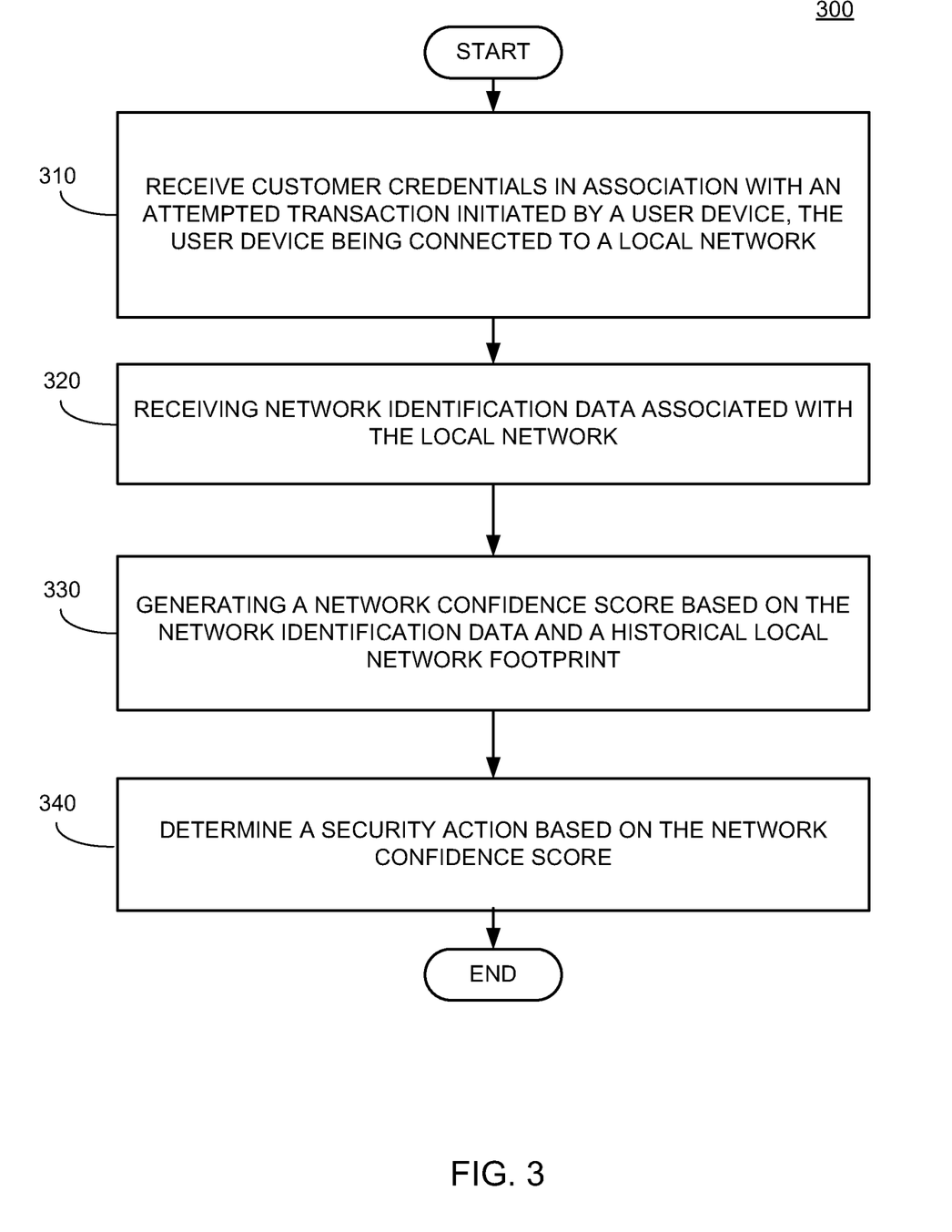
FIG. 3 is a flowchart of an exemplary system for providing network security.

FIG. 3 shows a flowchart of a method 300 for providing network security. Method 300 may be performed by some or all of user devices 102, 103, web server 110, transaction server 114, database 118, NCS device 120, and RAD device 122.

In block 310, system 100 (e.g., via web server 110) may receive customer credentials in association with an attempted transaction initiated by a user device (e.g., user device 120). An attempted transaction may refer to, for example, a financial transaction such as transferring money, payment of a bill, closing an account, and the like. In some embodiments, an attempted transaction may refer to an attempt to login to a website account (e.g., via web server 110) associated with a financial account. Customer credentials may include information sufficient to authenticate the user or user device 102 initiating the attempted transaction. For example, customer credentials may include a login name, an account number, a password, a pin number, an answer to a security question, or any other piece of information that may be used to verify the identity of a user or a user device (e.g., user device 102). According to some embodiments, the user device (e.g., user device 102) may be on a local network (e.g., local network 117). For example, a mobile phone 102 may be connected to a home Wi-Fi network 117 or a Wi-Fi network of a local business, and a mobile application of the mobile phone may enable the mobile phone 102 to access a web site (e.g., via web server 110) to attempt to login to a financial account. The user may input customer credentials into the mobile application of the mobile phone 102 and user device 102 may transmit the customer credentials to organization 108 (e.g., via web server 110).

In block 320, system 100 (e.g., via NCS device 120) may receive network identification data associated with the local network. For example, in some embodiments, a software program or mobile application housed on user device 102 may gather network identification data associated with user device 102, other user devices 103a, 103b, and any other device (such as routers, modems, etc.) that are connected to or included in the local network 117. As previously described above, in some embodiments, network identification data may include device data, location data, and extended network data. In some embodiments, the network identification data may be received from user device 102 or another device connected to or included in the local network 117. According to some embodiments, network identification data may be collected by web server 110.

In block 330, system 100 (e.g., via NCS device 120) may generate a network confidence score based on the network identification data and a historical local network footprint. According to some embodiments, NCS device 120 may store a historical local network footprint that is based on an initial set of network identification data received by NCS device 120. For example, NCS device 120 may receive an initial set of network identification data the first time user device 102 attempts to login to an account or initiate a transaction using local network 117. According to some embodiments, the historical local network footprint may represent an initial set of devices and attributes of the local network 117. For example, the first time a user uses a particular local network 117 (e.g., a home network) to log in to an account, NCS device 120 may generate an initial footprint from the initial network identification data associated with the particular local network 117 that may indicate, for example, that in addition to user device 102, local network 117 may have a laptop computer 103a having various attributes (e.g., screen size, OS version, etc.) and a tablet computer 103b having various attributes connected to it as well. As described previously above, NCS device 120 may generate a current footprint based on current network identification data associated with the local network 117 received by NCS device 120 in association with a current attempt by user device 102 to attempt an account login or initiate a transaction. NCS device 120 may generate a network confidence score based on the current network footprint (or the current network identification data) and the historical local network footprint. According to some embodiments, the historical local network footprint may be an initial footprint generated based on previous network identification data received in association with a previous transaction initiated by a previous device in association with the customer credentials. In some embodiments, the historical local network footprint may be a footprint generated based on previous network identification data received in association with a plurality of previous transactions initiated by one or more previous devices in association with the customer credentials.

As previously described above, NCS device 120 may include a software program that includes an algorithm that generates the network confidence score based on comparing the current network footprint to one or more previous network footprints. For example, in some embodiments, generating a network confidence score may include comparing (e.g., via NCS device 120) current network identification data to previous network identification data to determine the extent of an overlap between the network identification data and the previous network identification data. Further, in some embodiments, determining the extent of the overlap may include determining that zero or more other devices 103a, 103b connected to the local network 117 are the same as zero or more other devices 103a, 103b connected to a local network used by a previous user device 102 that initiated a previous transaction or login in association with the same customer credentials used in the current attempted transaction. In some embodiments, a single user device 102 may be used to initiate multiple login or transaction attempts over time. According to some embodiments, different user devices (e.g., user device 102, user device 103a, user device 103b) can be used to attempt different transactions in association with the same customer credentials, such that a first user device 102 is used in a first transaction or login attempt and a second user device 103a is used in a second transaction or login attempt. According to some embodiments, NCS device 120 may place a lower weighing on network data obtained from a new or previously unknown user device than the weighting placed on data associated with a known or previously used device, such that use of a new or unknown device may result in a lower network confidence score.

In block 340, system 100 (e.g., via RAD device 120) may determine a security action based on the network confidence score. As previously described above, in some embodiments, RAD device 120 may receive the network confidence score from NCS device 120 and use it to generate a security action. According to some embodiments, the security action may be one of, for example, denying the attempted transaction, issuing a security challenge, allowing the attempted transaction, flagging the transaction for further review, initiating extended logging of the session for fraud analysis, or redirection of the connection to a honeypot server. NCS device 120 may be configured to cause the security action to be executed. For example, NCS device 120 may send an instruction to web server 110 or transaction server 114 to deny or allow an attempted login or transaction. Further, NCS device 120 may be configured to transmit a security challenge to an account or device associated with a user associated with the customer credentials received in block 310. According to some embodiments, if the network confidence score is below a predetermined threshold, RAD device 120 may determine that the security action is to deny the attempted transaction or login. According to some embodiments, if network confidence score is above a predetermined threshold, RAD device 120 may determine that the security action is to allow the attempted transaction or login. According to some embodiments, if the network confidence score is below a first predetermined threshold and above a second predetermined threshold, RAD device 120 may determine that the security action is to issue a security challenge. In some embodiments, RAD device 120 may include a program or software that includes an algorithm for determining the security action based on the network confidence score. According to some embodiments, the predetermined thresholds may be different based on the type of transaction being requested. For example, a minimum predetermined threshold for gaining access to viewing a balance may be lower than the predetermined threshold for transferring funds. According to some embodiments, predetermined thresholds may be adjusted over time by, for example, an operator of system 100 or automatically using machine learning techniques. According to some embodiments, an attempted transaction may be associated with tiered thresholds such that meeting different thresholds results in different outcomes. For example, one threshold may be associated with no challenged being issued (i.e., access being granted), another threshold may be associated with an easier security challenge such as requesting the user to enter a pin, another threshold may be associated with a more difficult security challenge such as requiring the user to call a call center, and yet another threshold may be associated with denying access to the transaction entirely.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use cases describe examples of a typical user flow pattern. They are intended solely for explanatory purposes and not in limitation. A financial service provider may be concerned with preventing scammers from perpetrating fraudulent transactions using stolen customer credentials. To do so, the financial services provider may track details and information about the local network (e.g., local network 117) used by a device (e.g., user device 102) when attempting to login to a financial account or initiate a transaction over the Internet (e.g., via web server 110) in order to assess whether the device is where it claims to be. For example, the financial services provider may flag and prevent a login attempt if it detects that the login is originating from a local network in Russia, when the customer associated with those customer credentials lives in the U.S. and has never been to Russia. However, because external IP addresses may be easily spoofed by scammers, the system (e.g., system 100) may collect (e.g., via NCS device 120) device data, location data, and extended network data associated with the device being used to login or initiate a transaction (e.g., user device 102), as well as other user devices (e.g., user devices 103a, 103b) that are connected to the same local network and use this information to assess the legitimacy of the login attempt. The system (e.g., via NCS device 120) may create an initial footprint the first time a user uses a particular local network (e.g., local network 117) to access their account, and the initial footprint may indicate the number, nature, and attributes of all of the devices connected to the local network. The next time the user tries to log on to their account from the local network, the system (e.g., via NCS 120) may again collect device data, location data, and extended network data of the devices of the local network and compare that data to the initial footprint to determine the amount of overlap between the devices and attributes from the first time the user logged in to the second time. If there is little to no overlap, the system (e.g., via NCS device 120) may generate a low network confidence score, indicating that the system is not confident that the user is logging in from the same network that they did before. If there is a large amount of overlap, the system (e.g., via NCS device 120) may generate a high network confidence score, indicating that the system is fairly confident that the user is logging in from the same network that they did before. The network confidence score may then be considered by the system (e.g., via RAD device 122) alone or along with other data to make a determination of whether a particular login/transaction attempt should be allowed, prevented, or challenged.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A system for providing network security, comprising:
one or more processors; and
a memory in communication with the one or more processors and storing instructions that, when executed by the one or more processors, are configured to cause the system to:
receive, by a computing device and from a user device, customer credentials in association with an attempted transaction initiated by the user device, the user device being connected to a local network;
read, by the user device, broadcasted network identification data of each of a set of detectable devices connected to the local network, the network identification data comprising one or more of device data, location data, and extended network data associated with the set of detectable devices;
receive, by the computing device and from the user device, the network identification data associated with the set of detectable devices;
generate, by the computing device based on the network identification data of the set of detectable devices, a current network footprint associated with the local network, the current network footprint comprising an indication of the set of detectable devices and data representative of attributes of the set of detectable devices, wherein a weight assigned to at least one detectable device of the set of detectable devices indicates a degree of overlap between the current network footprint and a previous network footprint;
generate, by the computing device, a network confidence score based on the current network footprint by comparing the degree of overlap between the current network footprint and the previous network footprint;
adjust, by the computing device, the network confidence score by adjusting the assigned weight of the at least one detectable device of the set of detectable devices by measuring a transience level of the at least one detectable device of the set of detectable devices and lowering the assigned weight associated with the at least one detectable device when the transience level is below a predetermined threshold;
generate, by the computing device, a risk assessment based on the network confidence score and a plurality of risk factors;
determine, based on the risk assessment, a security action; and
perform, by the computing device, the security action.

2. The system of claim 1, wherein the security action is one of denying the attempted transaction, issuing a security challenge, or allowing the attempted transaction.

3. The system of claim 1, wherein generating the network confidence score is further based on the previous network footprint, the previous network footprint including a set of detectable devices previously connected to the local network and representative data of the set of detectable devices.

4. The system of claim 3, wherein the previous network footprint comprises at least one of: an initial footprint generated in association with a previous transaction initiated by a previous user device in association with the customer credentials or a footprint generated in association with a plurality of previous transactions initiated by one or more previous user devices in association with the customer credentials.

5. The system of claim 3, wherein the network confidence score represents an estimate of confidence that the local network is the same network as a historical local network.

6. The system of claim 4, wherein generating a network confidence score comprises determining an extent of an overlap between the network identification data associated with the current network footprint and previous network identification data associated with the previous network footprint.

7. The system of claim 6, wherein determining the extent of the overlap includes determining that zero or more detectable devices of the set of detectable devices connected to the local network are the same as zero or more detectable devices of a historical set of detectable devices.

8. The system of claim 1, wherein the network identification data includes device data, location data, and extended network data.

9. The system of claim 1, wherein the network confidence score is generated based on known devices, known networks, and known locations.

10. The system of claim 8, wherein extended network data comprises on or more of local-area network internet protocol (LAN IP) addresses, media access control (MAC) addresses, open/closed/filtered ports, operating system (OS) fingerprinting, bonjour services, universal plug and play (UPnP), host name, services, vendor, or domain name system (DNS) servers.

11. The system of claim 8, wherein device data comprises one or more of operating system (OS) version, screen size, mobile application version, installed applications, media access control (MAC) addresses, random access memory (RAM), storage size, processor type, caches, camera statistics, device management profiles, or Windows DOMAIN.

12. The system of claim 8, wherein location data comprises one or more of wide-area network internet protocol (WAN IP), connected service set identifier(s) (SSID(s)), disconnected stored SSID(s), location services, global positioning system (GPS), connected Bluetooth devices, disconnected paired Bluetooth devices, or trace routes.

13. A method of providing network security comprising:
receiving, by a first computing device and from a user device, customer credentials in association with an attempted transaction initiated by the user device, the user device being connected to a local network;
receiving, by the first computing device and from the user device, network identification data associated with each of a set of detectable devices, wherein the network identification data comprises one or more of device data, location data, and extended network data, and wherein the user device reads the network identification data broadcasted by each of the set of detectable devices;
generating, by the first computing device based on the network identification data of the set of detectable devices, a current network footprint associated with the local network, the current network footprint comprising an indication of the set of detectable devices and data representative of attributes of the set of detectable devices, wherein a weight assigned to at least one detectable device of the set of detectable devices indicates a degree of overlap between the current network footprint and a previous network footprint;
generating, by the first computing device, a network confidence score based on the current network footprint by comparing the degree of overlap between the current network footprint and the previous network footprint;
adjusting, by the computing device, the network confidence score by adjusting the assigned weight of at least one detectable device of the set of detectable devices by measuring a transience level of the at least one detectable device of the set of detectable devices and lowering the assigned weight associated with the at least one detectable device when the transience level is below a predetermined threshold;
generating, by the computing device, a risk assessment based on the network confidence score and a plurality of risk factors;
determining, based on the network confidence score, a security action; and
performing, by the computing device, the security action.

14. The method of claim 13, wherein the security action is one of denying the attempted transaction, issuing a security challenge, or allowing the attempted transaction.

15. The method of claim 13, wherein generating the network confidence score is further based on the previous network footprint, the previous network footprint including a set of detectable devices previously connected to the local network and representative data of the set of detectable devices.

16. The method of claim 15, wherein the network confidence score represents an estimate of confidence that the local network is the same network as a historical local network.

17. The method of claim 13, wherein the network identification data includes device data, location data, and extended network data.

18. A non-transitory computer-readable medium storing instructions that, when executed by one or more processors, cause a system to:
receive, from a user device, customer credentials in association with an attempted transaction initiated by the user device, the user device being connected to a local network;
receive, from the user device, network identification data associated with each of a set of detectable devices, wherein the network identification data comprises one or more of device data, location data, and extended network data, and wherein the user device reads the network identification data broadcasted by each of the set of detectable devices;
generate, based on the network identification data of the set of detectable devices, a current network footprint associated with the local network, the current network footprint comprising an indication of the set of detectable devices and data representative of attributes of the set of detectable devices, wherein a weight assigned to each detectable device of the set of detectable devices indicates a degree of overlap between the current network footprint and a previous network footprint;
generate a network confidence score based on the current network footprint by comparing the degree of overlap between the current network footprint and the previous network footprint;
increase the network confidence score when the user device is connected to a local network that has had a previous network footprint generated more than once;

decrease the network confidence score when the user device is connected to a local network that has not had a previous network footprint generated at least once;

generate a risk assessment based on the network confidence score and a plurality of risk factors;

determine, based on the network confidence score, a security action; and perform the security action.

19. The non-transitory computer-readable medium of claim 18, wherein the network confidence score represents an estimate of confidence that the local network is the same network as a previous local network.

20. The system of claim 3, wherein the previous network footprint comprises an indication of a historical set of detectable devices that were connected to a previous local network when the user device attempted an earliest transaction.

21. The system of claim 1, wherein performing the security action further comprises:

determining, by the computing device, that the local network is unknown;

transmitting, from the computing device and to the user device, a request for second-level user authentication; and receiving, from the user device, second user credentials associated with second-level user authentication.

22. The system of claim 1, wherein the plurality of risk factors include at least one of location information, a known or unknown status of the user device, or recent account activity of the user device.

23. The system of claim 1, wherein the one or more processors are further configured to cause the system to:

connect, via a software application of the user device, to each of the set of detectable devices connected to the local network; and obtain respective network identification data from each of the set of detectable devices.

24. The method of claim 13, wherein the plurality of risk factors include at least one of location information, a known or unknown status of the user device, or recent account activity of the user device.

25. The method of claim 13, further comprising:

connecting, via a software application of the user device, to each of the set of detectable devices connected to the local network; and obtaining respective network identification data from each of the set of detectable devices.

26. The non-transitory computer-readable medium of claim 18, further configured to:

connect, via a software application of the user device, to each of the set of detectable devices connected to the local network; and obtain respective network identification data from each of the set of detectable devices.

* * * * *